United States Patent
Singh et al.

(10) Patent No.: US 11,588,835 B2
(45) Date of Patent: *Feb. 21, 2023

(54) DYNAMIC NETWORK SECURITY MONITORING SYSTEM

(71) Applicant: Bank of America Corporation, Charlotte, NC (US)

(72) Inventors: Shailendra Singh, Thane West (IN); Satyajeet Priyadarshi, Pune (IN)

(73) Assignee: Bank of America Corporation, Charlotte, NC (US)

( * ) Notice: Subject to any disclaimer, the term of this patent is extended or adjusted under 35 U.S.C. 154(b) by 80 days.

This patent is subject to a terminal disclaimer.

(21) Appl. No.: 17/323,731

(22) Filed: May 18, 2021

(65) Prior Publication Data

US 2022/0377087 A1    Nov. 24, 2022

(51) Int. Cl.
*H04L 9/40* (2022.01)
*G06N 20/00* (2019.01)

(52) U.S. Cl.
CPC ......... *H04L 63/1416* (2013.01); *G06N 20/00* (2019.01); *H04L 63/0236* (2013.01); *H04L 63/107* (2013.01); *H04L 63/1433* (2013.01); *H04L 63/20* (2013.01)

(58) Field of Classification Search
CPC ............. H04L 63/1416; H04L 63/0236; H04L 63/1433; H04L 63/20
USPC ...................................................... 726/22
See application file for complete search history.

(56) References Cited

U.S. PATENT DOCUMENTS

| | | |
|---|---|---|
| 7,493,659 B1 | 2/2009 | Wu et al. |
| 7,610,375 B2 | 10/2009 | Portolani et al. |
| 8,737,204 B2 | 5/2014 | Szab et al. |
| 8,817,655 B2 | 8/2014 | Szabo et al. |
| 8,839,430 B2 | 9/2014 | Määttä et al. |
| 8,910,285 B2 | 12/2014 | Kolbitsch et al. |

(Continued)

FOREIGN PATENT DOCUMENTS

| | | |
|---|---|---|
| EP | 1858221 A1 | 11/2007 |
| EP | 2112803 A1 | 10/2009 |

(Continued)

OTHER PUBLICATIONS

Singh, S. et al., "Real-Time Anomaly Detection for Network Security," U.S. Appl. No. 17/323,590, filed May 18, 2021, 44 pages.

(Continued)

*Primary Examiner* — Teshome Hailu

(57) ABSTRACT

A device configured to identify a first set of clusters based on the group information and to determine a first cluster quantity that identifies a number of clusters within the first set of clusters. The device is further configured to obtain user interaction data for user devices, to input the user interaction data into a machine learning model, to receive a second set of clusters from the machine learning model based on the user interaction data, and to determine a second cluster quantity that identifies a number of clusters within the second set of clusters. The device is further configured to determine the second cluster quantity is greater than the first cluster quantity, to identify a cluster that is not present in the first set of clusters, and to modify settings on a user device from within the cluster.

20 Claims, 7 Drawing Sheets

(56) References Cited

U.S. PATENT DOCUMENTS

| | | |
|---|---|---|
| 8,914,878 B2 | 12/2014 | Burns et al. |
| 9,083,730 B2 | 7/2015 | Coskun et al. |
| 9,094,288 B1 | 7/2015 | Nucci et al. |
| 9,143,393 B1 | 9/2015 | Bird et al. |
| 9,191,400 B1 | 11/2015 | Ptasinski et al. |
| 9,197,654 B2 | 11/2015 | Ben-Shalom et al. |
| 9,367,872 B1 * | 6/2016 | Visbal .................. G06F 16/287 |
| 9,386,031 B2 | 7/2016 | Yablokov |
| 9,413,781 B2 | 8/2016 | Cunningham et al. |
| 9,483,742 B1 | 11/2016 | Ahmed |
| 9,521,162 B1 | 12/2016 | Zand et al. |
| 9,686,312 B2 | 6/2017 | Di Pietro et al. |
| 9,710,653 B2 | 7/2017 | Kotler et al. |
| 9,712,548 B2 | 7/2017 | Shmueli et al. |
| 9,747,446 B1 | 8/2017 | Pidathala et al. |
| 9,749,353 B1 | 8/2017 | Benskin et al. |
| 9,794,278 B1 | 10/2017 | Leita et al. |
| 9,900,342 B2 | 2/2018 | Cruz Mota et al. |
| 10,021,116 B2 | 7/2018 | Bassett |
| 10,044,751 B2 | 8/2018 | Huston, III |
| 10,091,218 B2 | 10/2018 | Holland et al. |
| 10,454,955 B2 | 10/2019 | Schulman et al. |
| 10,541,903 B2 | 1/2020 | Wang et al. |
| 10,728,263 B1 | 7/2020 | Neumann |
| 10,756,956 B2 | 8/2020 | Gammel et al. |
| 10,785,249 B2 | 9/2020 | Mayorgo |
| 10,911,471 B1 * | 2/2021 | Song et al. |
| 2003/0145226 A1 | 7/2003 | Bruton, III et al. |
| 2008/0262991 A1 | 10/2008 | Kapoor et al. |
| 2013/0185795 A1 | 7/2013 | Winn et al. |
| 2014/0041032 A1 | 2/2014 | Scheper et al. |
| 2014/0101761 A1 | 4/2014 | Harlacher et al. |
| 2014/0297572 A1 | 10/2014 | Zambon |
| 2016/0006749 A1 * | 1/2016 | Cohen .................. G06Q 40/12 726/23 |
| 2016/0180451 A1 * | 6/2016 | Visbal ................ H04L 63/1425 705/35 |
| 2016/0306967 A1 | 10/2016 | Hart et al. |
| 2016/0344758 A1 * | 11/2016 | Cohen ................ G06F 3/04842 |
| 2017/0223034 A1 | 8/2017 | Singh et al. |
| 2017/0339022 A1 | 11/2017 | Hegde et al. |
| 2018/0144050 A1 * | 5/2018 | Whillock ............ G06F 16/9535 |
| 2019/0260782 A1 | 8/2019 | Humphrey et al. |
| 2021/0120033 A1 * | 4/2021 | Gorrepati ............. H04L 9/0637 |

FOREIGN PATENT DOCUMENTS

| | | |
|---|---|---|
| EP | 2040435 B1 | 11/2013 |
| EP | 2785008 A1 | 10/2014 |
| EP | 2785009 A1 | 10/2014 |
| EP | 2975801 B1 | 6/2016 |
| EP | 3660719 A1 | 6/2020 |
| WO | 2015051185 A1 | 4/2015 |

OTHER PUBLICATIONS

Singh, S. et al., "Temporal-Based Anomaly Detection for Network Security," U.S. Appl. No. 17/323,651, filed May 18, 2021, 43 pages.

* cited by examiner

DYNAMIC NETWORK SECURITY MONITORING SYSTEM

TECHNICAL FIELD

The present disclosure relates generally to network security, and more specifically to dynamic network security monitoring systems.

BACKGROUND

In a network environment, devices are in data communication with other devices that may be distributed anywhere in the world. These network environments allow data and information to be shared among devices. Some of the technical challenges that occur when data is exchanged between devices are controlling data leakage, unauthorized access to data, and preventing malicious activities. Data storing devices, such as databases and servers, are vulnerable to attacks. This vulnerability poses several network security challenges. Existing systems are typically unable to detect a network attack until after the attack has occurred. This delayed response allows a bad actor to gain access to sensitive information within the network and/or allows bad actors to perform other malicious activities such as data exfiltration or uploading malware.

SUMMARY

The system disclosed in the present application provides a technical solution to the technical problems discussed above by leveraging machine learning to detect anomalies and unauthorized communication channels within a network. The disclosed system provides several practical applications and technical advantages which include a process for identifying clusters of user devices and the communication channels among the user devices based on information about how the user devices interact with each other. This process provides a practical application by improving the network security of the system by allowing the system to identify unexpected or unauthorized communication channels among the user devices. This means that the system is able to protect the data within the network and to prevent a bad actor from performing malicious activities by identifying unauthorized communication channels before a network attack occurs. The disclosed system also provides another practical application that includes a process for detecting unauthorized communication channels that form over time. As user devices interact with each other over time, new unauthorized communication channels may be formed between the user devices. These processes allow the information system to detect and prevent unauthorized access to data and other network security vulnerabilities within the network.

These practical applications not only improve the network security of the system, they also improve the underlying network and the devices within the network. For example, when a data exfiltration attack occurs, there is an increase in the number of network resources and bandwidth that are consumed which reduces the throughput of the network. By preventing data exfiltration attacks, the system is able to prevent any unnecessary increases in the number of network resources and bandwidth that are consumed that would otherwise negatively impact the throughput of the system. As another example, when a malware attack occurs, one or more devices within the network may be taken out of service until the malware can be removed from the devices. Taking devices out of service negatively impacts the performance and throughput of the network because the network has fewer resources for processing and communicating data. By preventing malware types of attacks, the system prevents any comprised devices from being taken out of service due to an attack that would otherwise negatively impact the performance and throughput of the network.

In one embodiment, the information system comprises a database that is configured to store group information for a plurality of user devices. The group information identifies work groups within a network and the user devices that are members of each work group. The information system further includes a network security monitoring device that is configured to obtain group information from the database, to identify a first set of clusters based on the group information, and to determine a first cluster quantity that identifies a number of clusters within the first set of clusters. Through this process the network security monitoring device determines an expected number of clusters of user devices based on the group information.

The network security monitoring device is further configured to obtain user interaction data for user devices. The user interaction data identifies activities performed by the user devices. The network security monitoring device is further configured to input the user interaction data into a machine learning model and to receive a second set of clusters from the machine learning model based on the user interaction data. The network security monitoring device is further configured to determine a second cluster quantity that identifies a number of clusters within the second set of clusters and to compare the first cluster quantity to the second cluster quantity. Through this process the network security monitoring device determines an actual number of clusters of user devices based on the user interaction data. The network security monitoring device then compares the expected number of clusters to the number of detected clusters to determine whether there is a mismatch. When a mismatch occurs, the network security monitoring device may then check for any unauthorized communication channels between the unexpected clusters.

After detecting an anomaly of an unauthorized communication channel, the network security monitoring device may modify the settings on any user devices that are associated with the unauthorized communication channel. For example, in response to determining that the second cluster quantity is greater than the first cluster quantity, the network security monitoring device is configured to identify a cluster that is not present in the first set of clusters, to identify a user device from within the cluster, and to modify settings on the user device.

In another embodiment, the information system comprises a network security monitoring device that is configured to obtain a first user interaction data at a first time instance for user devices. The first user interaction data identifies activities performed by the plurality of user devices before the first time instance. The network security monitoring device is further configured to obtain a first set of clusters from a machine learning model based on the first user interaction data and to determine a first cluster quantity for the first set of clusters. The network security monitoring device is further configured to obtain a second user interaction data at a second time instance for the user devices. The second user interaction data identifies activities performed by the plurality of user devices between the first time instance and the second time instance. The network security monitoring device is further configured to obtain a second set of clusters from the machine learning model based on the second user interaction data, to determine a second cluster quantity for the second set of clusters, and to compare the second cluster quantity to the first cluster quantity. Through this process the network security monitoring device periodically compares the number of detected clusters to determine whether there has been an increase in the number of detected cluster. An increase in the number of detected cluster indicates an anomaly and that one or more unauthorized communication channels may be present.

After detecting an anomaly of an unauthorized communication channel, the network security monitoring device may modify the settings on any user devices that are associated with the unauthorized communication channel. For example, in response to determining that the second cluster quantity is greater than the first cluster quantity, the network security monitoring device is configured to identify a cluster that is not present in the first set of clusters, to identify a user device from within the cluster, and to modify settings on the user device.

In another embodiment, the information system comprises an network security monitoring device that is configured to identify a first set of clusters based on the group information and to determine a first cluster quantity that identifies a number of clusters within the first set of clusters. The network security monitoring device is further configured to obtain user interaction data for user devices. The user interaction data identifies activities performed by the user devices. The network security monitoring device is further configured to input the user interaction data into a machine learning model and to receive a second set of clusters from the machine learning model based on the user interaction data. The network security monitoring device is further configured to determine a second cluster quantity that identifies a number of clusters within the second set of clusters and to compare the first cluster quantity to the second cluster quantity. In response to determining that the second cluster quantity is greater than the first cluster quantity, the network security monitoring device is configured to identify a cluster that is not present in the first set of clusters, to identify a user device from within the cluster, and to modify settings on the user device.

Certain embodiments of the present disclosure may include some, all, or none of these advantages. These advantages and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

System Overview

Figure 1:
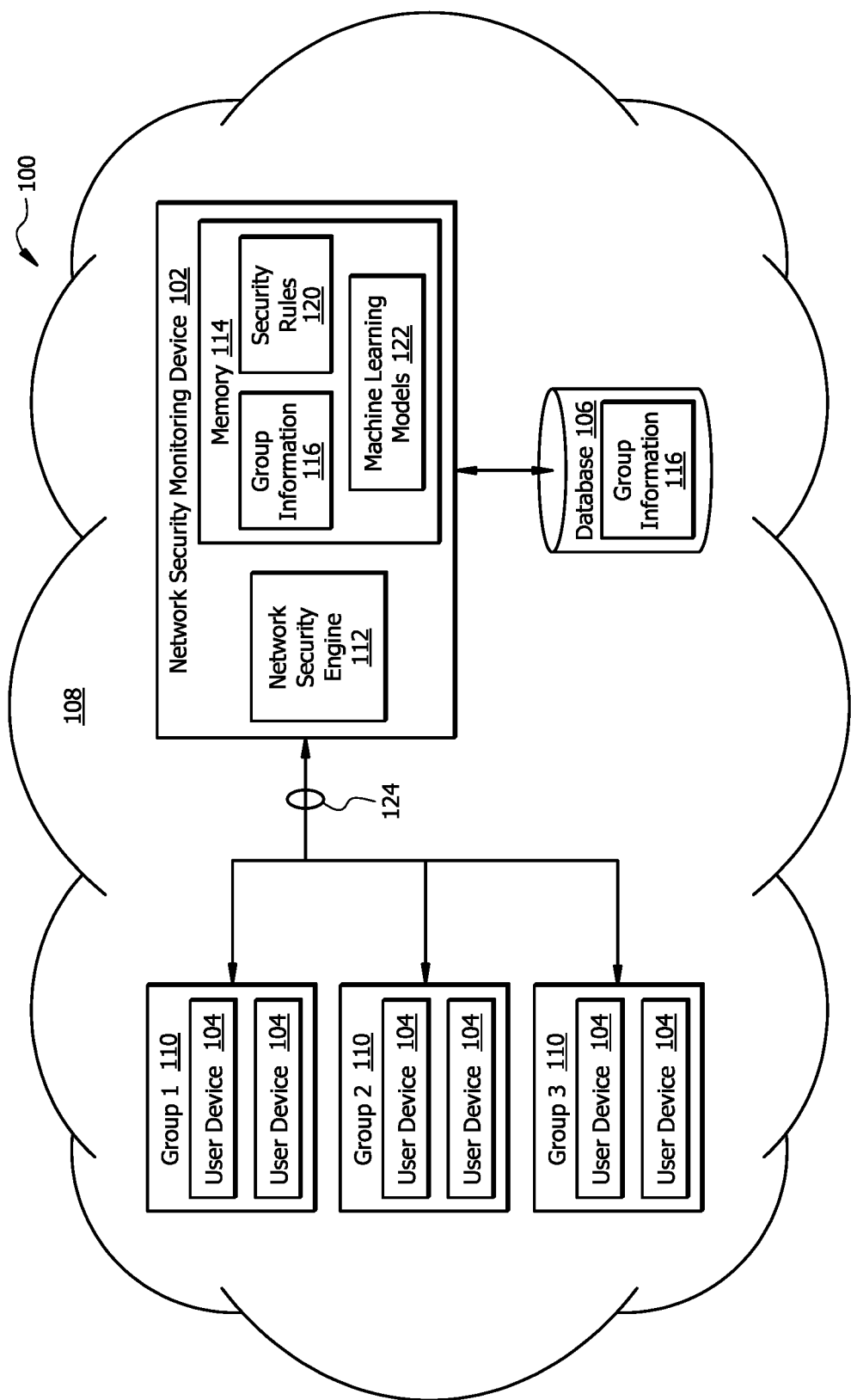
FIG. 1 is a schematic diagram of an embodiment of an information system that is configured to employ anomaly detection.

FIG. 1 is a schematic diagram of an embodiment of an information system 100 that is configured to employ anomaly detection. An anomaly may be unexpected clusters 302 of user devices 104 and/or unauthorized communication channels 304 within a network 108. A communication channel 304 is a flow path where data can be sent or received by user devices 104 within a cluster 302. The information system 100 is generally configured to detect anomalies within the information system 100 based on user interaction data 124 that is associated with the user devices 104 within the network 108. The information system 100 is configured to employ machine learning to observe the interactions between the user devices 104 and to detect any unexpected or unauthorized communication channels 304 between the user devices 104. The information system 100 may also be configured to observe interactions between the user devices 104 over time and to detect any new unexpected or unauthorized communication channels 304 that form between the user devices 104. As the user devices 104 interact with each other over time, new unauthorized communication channels 304 may be formed between the user devices 104. The information system 100 employs machine learning to observe the interactions between the user devices 104 over time and to detect any of these unexpected or unauthorized communication channels 304 that form between the user devices 104. In response to detecting an unauthorized communication channel 304, the information system 100 is further configured to identify a user device 104 that is associated with an unauthorized communication channel 304 and to modify the hardware, software, and/or network settings on the user device 104 to remove the unauthorized communication channel 304. These processes allow the information system 100 to detect and prevent unauthorized access to data and other network security vulnerabilities within the network 108.

In one embodiment, the information system 100 comprises a network security monitoring device 102, a plurality of user devices 104, and one or more databases 106 that are in signal communication with each other over a network 108. The network 108 may be any suitable type of wireless and/or wired network including, but not limited to, all or a portion of the Internet, an Intranet, a private network, a public network, a peer-to-peer network, the public switched telephone network, a cellular network, a local area network (LAN), a metropolitan area network (MAN), a personal area network (PAN), a wide area network (WAN), and a satellite network. The network 108 may be configured to support any suitable type of communication protocol as would be appreciated by one of ordinary skill in the art.

User Devices

Examples of user devices 104 include, but are not limited to, a smartphone, a tablet, a laptop, a computer, a keycard, a key fob, or any other suitable type of user device. Each user device 104 is uniquely associated with a user and is generally configured to provide access to data, applications, and network resources for the user. For example, a user device 104 may be associated with an employee and configured to provide the employee access to a company's data and resources. Each user device 104 is configured to output user interaction data 124 for a user. The user interaction data 124 comprises information about any activities that are performed by a user using the user device 104. For example, the user interaction data 124 may comprise information about applications are accessed by a user, information about incoming or outgoing emails for a user, information about incoming or outgoing voice communications for a user, social media applications that are used by a user, physical locations that are accessed by a user, or any other suitable type of information that is associated with the activities of a user.

In one embodiment, a user device 104 may be configured to periodically send user interaction data 124 to the network security monitoring device 102. For example, a user device 104 may be configured to send user interaction data 124 at predetermined time intervals (e.g. hourly or daily). In other embodiments, a user device 104 may be configured to send user interaction data 124 in response to data requests from the network security monitoring device 102.

Databases

Examples of a database 106 include, but are not limited to, file repositories, computers, databases, memories, servers, shared folders, or any other suitable type of networking device. The database 106 is generally configured to store group information 116 and/or any other suitable type of information that is associated with the information system 100. The group information 116 comprises information about a plurality of work groups 110 within the information system 100 and the user devices 104 that are members of each work group 110. For example, the group information 116 may comprise an organization mapping, a network mapping, or any other suitable type of information that identifies different work groups 110 and user devices 104 that are members of a work group 110. Examples of work groups 110 include, but are not limited to, departments, work teams, project teams, or any other suitable type of group of users within the information system 100. In FIG. 1, the information system 100 shows a single database 106. In other embodiments, the information system 100 may comprise any other suitable number of databases 106.

Network Security Monitoring Device

Examples of the network security monitoring device 102 include, but are not limited to, a server, a computer, or any other suitable type of network device. In one embodiment, the network security monitoring device 102 comprises a network security engine 112 and a memory 114. Additional details about the hardware configuration of the network security monitoring device 102 are described in FIG. 7. The memory 114 is configured to store group information 116, security rules 120, machine learning models 122, and/or any other suitable type of data.

In one embodiment, the network security engine 112 is generally configured to detect anomalies and unauthorized communication channels 304 within the information system 100 based on user interaction data 124 that is associated with the user devices 104 in the network 108. In this case, the network security engine 112 employs machine learning to observe the interactions between the user devices 104 and to detect any unexpected communication channels 304 between the user devices 104. In some embodiments, the network security engine 112 may be configured to employ a temporal-based anomaly detection process. In this case, the network security engine 112 observes interactions between the user devices 104 over time and to detects any new or unexpected communication channels 304 that form between the user devices 104. An example of the network security engine 112 in operation is described in more detail below in FIGS. 2 and 5.

The security rules 120 are generally configured to provide a mapping between different types of user interactions and setting on a user device 104. The security rules 120 may comprise instructions or commands for modifying settings on a user device 104 to either allow or block certain types of user interactions. For example, the security rules 120 may comprise instructions for restricting access to communication channels 304, applications, web sites, physical locations, or any other suitable type of user device setting based on user interactions that are associated with a user.

Examples of machine learning models 122 include, but are not limited to, a multi-layer perceptron, a recurrent neural network (RNN), an RNN long short-term memory (LSTM), or any other suitable type of neural network model. In one embodiment, the machine learning models 122 comprise a machine learning model 122 that is generally configured to receive user interaction data 124 as an input and to output a set of clusters 302 based on the provided user interaction data 124. Each cluster 302 identifies user devices 104 that interact with each other or that have a communication channel 304 with each other. For example, the machine learning model 122 may be configured to output a list of cluster identifiers (e.g. alphanumeric identifiers) that identify the clusters 302 that were detected by the machine learning model 122. Each cluster identifier may be associated with one or more device identifiers that identify the user devices 104 that are members of the cluster 302. Examples of device identifiers include, but are not limited to, a device name, a phone number, an email address, a Media Access Control (MAC) address, an Internet Protocol (IP) address, or any other suitable device identifier. The machine learning model 122 is trained using training data that comprises different types of user interaction data 124. During the training process, the machine learning model 122 determines weights and bias values that allow the machine learning model 122 to map certain types of user interaction data 124 to different clusters 302. Through this process, the machine learning model 122 is able to identify clusters 302 based on user interaction data 124 that is associated with a plurality of user devices 104. The network security engine 112 may be configured to train the machine learning models 122 using any suitable technique as would be appreciated by one of ordinary skill in the art. In some embodiments, the machine learning models 122 may be stored and/or trained by a device that is external from the network security monitoring device 102.

Anomaly Detection Process

Figure 2:
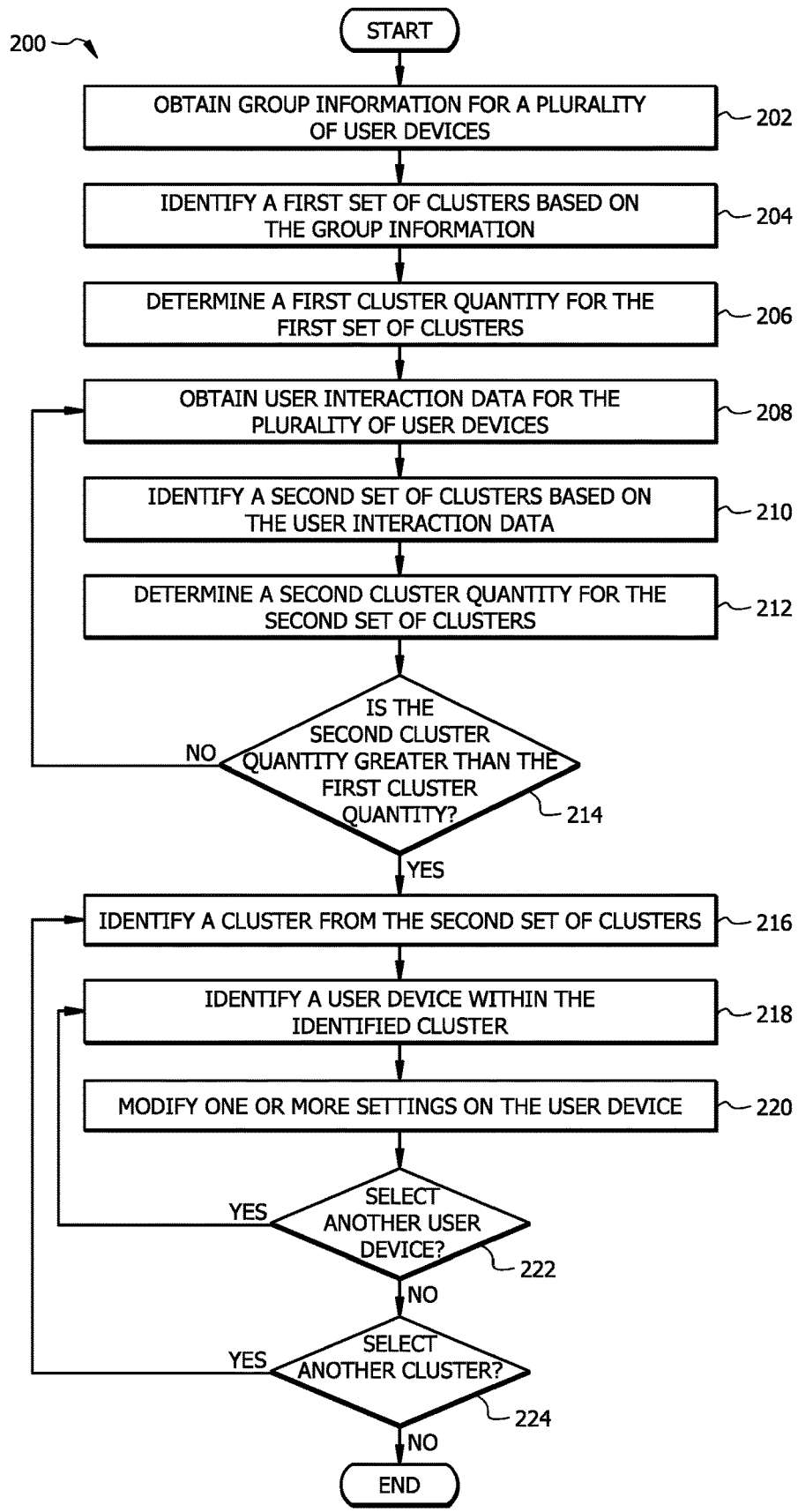
FIG. 2 is a flowchart of an embodiment of an anomaly detection process for the information system.

FIG. 2 is a flowchart of an embodiment of an anomaly detection process 200 for the information system 100. The information system 100 may employ process 200 to detect anomalies within the information system 100 based on user interaction data 124 that is associated with the user devices 104 in the network 108. Process 200 employs machine learning to observe the interactions between the user devices 104 and to detect any unexpected or unauthorized communication channels 304 between the user devices 104. In response to detecting an unauthorized communication channel 304, the information system 100 is further configured to identify a user device 104 that is associated with an unauthorized communication channel 304 and to modify the hardware, software, and/or network settings on the user device 104 to remove the unauthorized communication channel 304. This process allows the information system 100 to detect and prevent unauthorized access to data and other network security vulnerabilities within the network 108.

At step 202, the network security monitoring device 102 obtains group information 116 for a plurality of user devices 104. For example, the network security monitoring device 102 may obtain the group information 116 by downloading or accessing the group information 116 that is stored in the database 106. As another example, the network security monitoring device 102 may obtain the group information 116 by sending a data request to the database 116. In other examples, the network security monitoring device 102 may obtain the group information 116 from its local memory 114 when the group information 116 has been previously stored within the network security monitoring device 102.

Figure 3:
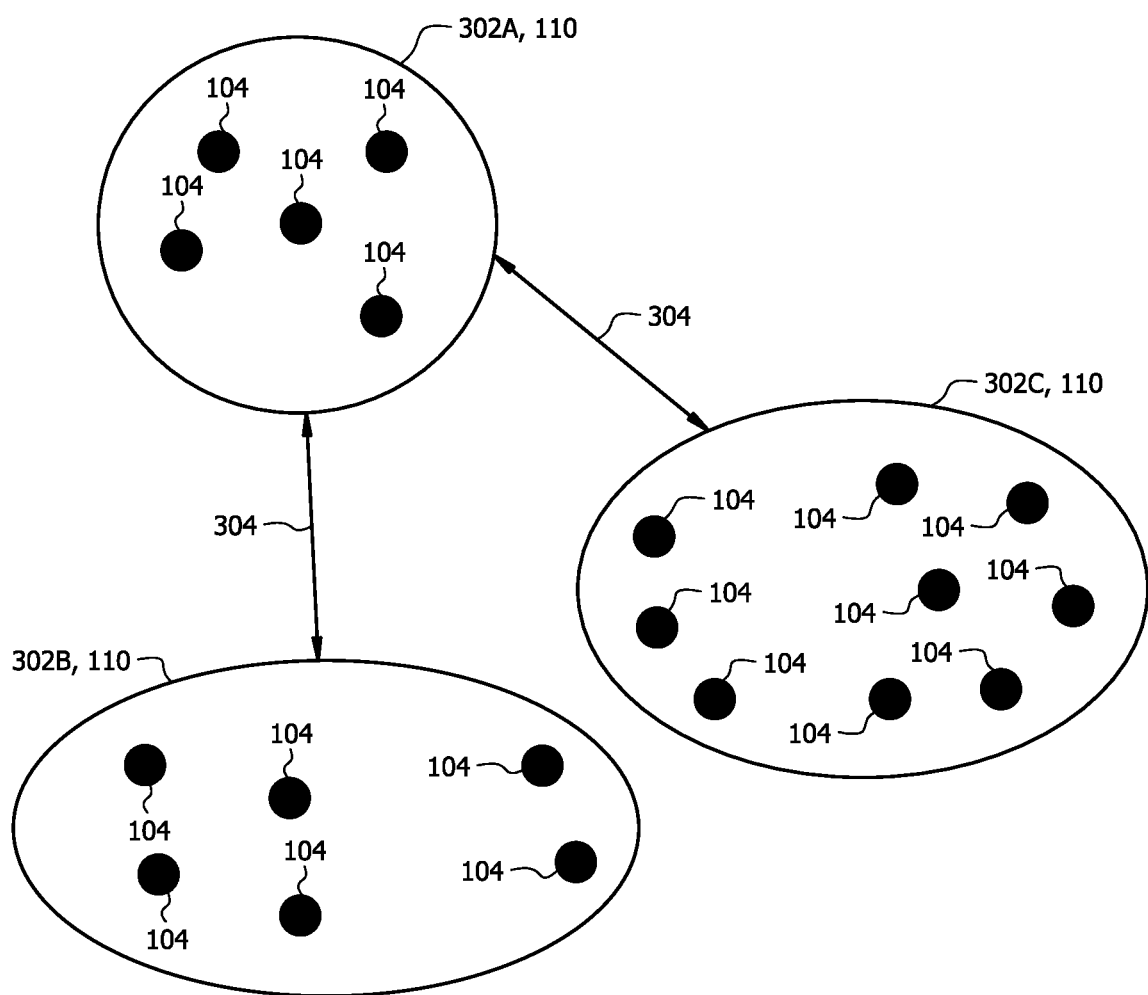
FIGS. 3 and 4 illustrate examples of clusters of user devices that are detected during the anomaly detection process.

At step 204, the network security monitoring device 102 identifies a first set of clusters 302 based on the group information 116. Referring to FIG. 3 as an example, the network security monitoring device 102 may use the group information 116 to identify a plurality of work groups 110 and the user devices 104 that are members of each work group 110. The network security monitoring device 102 then assigns each work group 110 to a cluster 302. In FIG. 3, the network security monitoring device 102 identifies three work groups 110 and three clusters 302 (shown as clusters 302A, 302B, and 302C) based on the group information 116. The network security monitoring device 102 may also identify any communication channels 304 that exist between the clusters 302. A communication channel 304 is a flow path where data can be sent or received by user devices 104 within a cluster 302. Examples of communication channels 304 include, but are not limited to, email, social media, file sharing, voice calls, text-based messaging, or any other suitable type technique for sending or receiving data. In this example, the network security monitoring device 102 determines that a first communication channel 304 exists between cluster 302A and cluster 302B. The network security monitoring device 102 also determines that a second communication channel 304 exists between 302A and 302C. This means that the user devices 104 within cluster 302A are able to exchange (i.e. send and receive) data with the user devices 104 within clusters 302B and 302C. In this example, the network security monitoring device 102 also determines that a communication channel 304 should not exist between cluster 302B and cluster 302C based on the group information 116. This means that the user devices 104 within cluster 302B should not be able to exchange data with the user devices 104 within cluster 302C.

Returning to FIG. 2 at step 206, the network security monitoring device 102 determines a first cluster quantity for the first set of clusters 302. Here, the network security monitoring device 102 counts the number of clusters 302 that have been identified based on the group information 116. Continuing with the previous example from FIG. 3, the network security monitoring device 102 sets the first cluster quantity to a value of three.

At step 208, the network security monitoring device 102 obtains user interaction data 124 for the plurality of user devices 104. In one embodiment, the network security monitoring device 102 may periodically receive user interaction data 124 from the plurality of user devices 104. For example, the network security monitoring device 102 may be configured to receive user interaction data 124 at predetermined time intervals (e.g. hourly or daily). In other embodiments, the network security monitoring device 102 may be configured to send data requests to the user devices 104 to request the user interaction data 124.

At step 210, the network security monitoring device 102 identifies a second set of clusters 302 based on the user interaction data 124. Referring to the example in FIG. 4, the network security monitoring device 102 may input the user interaction data 124 into the machine learning model 122 to determine how the user devices 104 within clusters 302A, 302B, and 302C are interacting and communicating with each other. The user interaction data 124 provides a record of activities and communications that have been used among the user devices 104. The network security monitoring device 102 receives information about the second set of clusters 302 in response to inputting the user interaction data 124 into the machine learning model 122. For example, the machine learning model 122 may output a list of cluster identifiers (e.g. alphanumeric identifiers) that identify the clusters 302 that were detected by the machine learning model 122. Each cluster identifier is associated with device identifiers that identify the user devices 104 that are members of the cluster 302.

Figure 4:
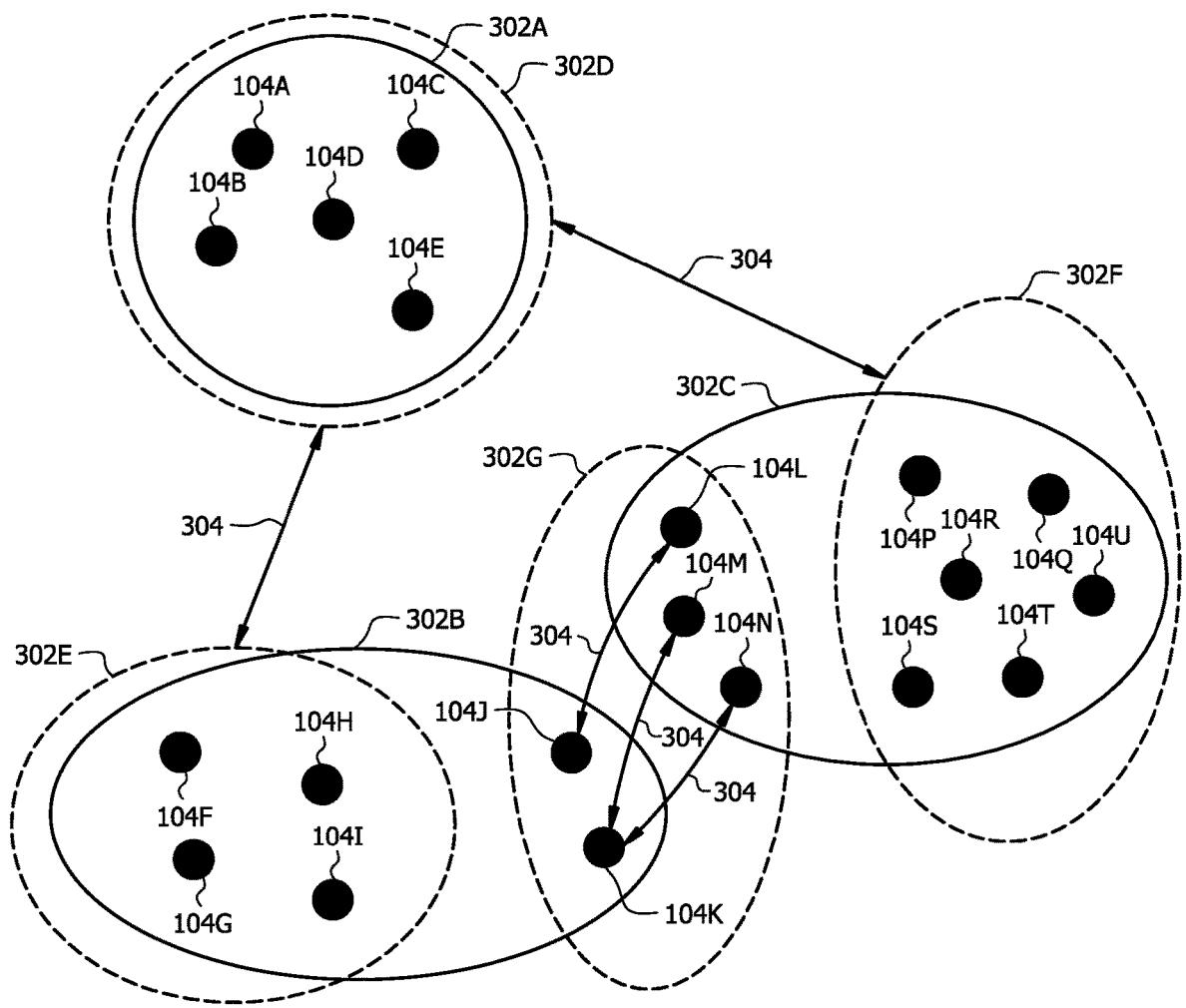

In the example shown in FIG. 4, the machine learning model 122 identifies four clusters 302 based on the user interaction data 124. The first cluster 302D corresponds with the cluster 302A that was previously identified based on the group information 116. The first cluster 302D includes user devices 104A, 104B, 104C, 104D, and 104E. The second cluster 302E includes a subset of the user devices 104 that were previously associated with cluster 302B. The second cluster 302E includes user devices 104F, 104G, 104H, and 104I. The third cluster 302F includes a subset of the user devices 104 that were previously associated with cluster 302C. The third cluster 302F includes user devices 104P, 104Q, 104R, 104S, 104T, and 104U. The fourth cluster 302G includes a combination of user devices 104 that were previously associated with either 302B or 302C. The fourth cluster 302G includes user devices 104J, 104K, 104L, 104M, and 104N. In this example, the fourth cluster 302G is generated based on the communications between user devices 104 within cluster 302B and cluster 302C. The fourth cluster 302G captures any unexpected or unauthorized communication channels 304 that exist between cluster 302B and cluster 302C.

Returning to FIG. 2 at step 212, the network security monitoring device 102 determines a second cluster quantity for the second set of clusters 302. Here, the network security monitoring device 102 counts the number of clusters 302 that have been identified by the machine learning model 122 based on the user interaction data 124. Continuing with the previous example from FIG. 4, the network security monitoring device 102 sets the second cluster quantity to a value of four.

At step 214, the network security monitoring device 102 determines whether the second cluster quantity is greater than the first cluster quantity. The network security monitoring device 102 compares the expected number of cluster 302 based on the group information 116 (i.e. the first cluster quantity) to the determined number of clusters 302 based on the user interaction data 124 (i.e. the second cluster quantity) to determine whether there any new or unaccounted for clusters 302. Continuing with the previous example from FIG. 4, the network security monitoring device 102 determines that the second cluster quantity is greater than the first cluster quantity. This means that an anomaly has been detected because at least one new cluster 302 was detected that was not expected based on the group information 116. When the second cluster quantity is equal to the first cluster quantity, this means that all of the expected clusters 302 have been accounted for and that an anomaly has not been detected.

The network security monitoring device 102 returns to step 208 in response to determining that the second cluster quantity is not greater than the first cluster quantity. In this case, the network security monitoring device 102 returns to step 208 to wait for additional user interaction data 124 to process to determine whether an anomaly has occurred or an unauthorized communication channel 304 has been detected. The network security monitoring device 102 proceeds to step 216 in response to determining that the second cluster quantity is greater than the first cluster quantity. In this case, the network security monitoring device 102 proceeds to step 216 to identify the user devices 104 that are associated with the unexpected communication channels 304 and to modify the settings of these user devices 104 to either prevent or allow these communication channels 304.

At step 216, the network security monitoring device 102 identifies a cluster 302 from the second set of clusters 302 that is not present in the first set of clusters 302. Here, the network security monitoring device 102 identifies one of the clusters 302 from the second set of clusters 302 that was not expected based on the group information 116. Continuing with the previous example from FIG. 4, the network security monitoring device 102 identifies the fourth cluster 302G from among the second set of clusters 302 since it includes a combination of user devices 104 from cluster 302B and 302C. The combination of user devices 104 from cluster 302B and 302C indicates that one or more unauthorized communication channels 304 exists among these user devices 104.

At step 218, the network security monitoring device 102 identifies a user device 104 within the identified cluster 302. Here, the network security monitoring device 102 identifies one of the user devices 104 (e.g. user device 104J, 104K, 104L, 104M, or 104N) within the identified cluster 302 that is associated with the unauthorized communication channels 304. Continuing with the previous example from FIG. 4, the network security monitoring device 102 may identify user device 104K.

At step 220, the network security monitoring device 102 modifies one or more settings on the selected user device 104. Here, the network security monitoring device 102 may adjust the hardware, software, and/or network settings on the user device 104 to remove any unauthorized communication channels 304. The network security monitoring device 102 first identifies the types of user interactions that were performed by the user device 104 based on the user interaction data 124 that is associated with the user device 104. The network security monitoring device 102 then uses the security rules 120 to identify any corresponding hardware, software, and/or network settings on the user device 104 that can be modified to remove any unauthorized communication channels 304. The security rules 120 comprise instructions or commands for modifying the settings on a user device 104 to either allow or block certain types of user interactions. The network security monitoring device 102 may modify the settings on the user device 104 by applying the instructions from the security rules 120 to the user device 104 or by transmitting the instructions to the user device 104.

As an example, the network security monitoring device 102 may identify a second user device 104 from within the identified cluster 302 that the user device 104 communicated with based on the user interaction data 124. In this example, the second user device 104 is also associated with the unauthorized communication channel 304. The network security monitoring device 102 may then modify hardware, software, and/or network settings on the user device 104 to restrict future communications between the user device 104 and the second user device 104. For instance, the network security monitoring device 102 may identify user device 104M and may modify settings on user device 104K to restrict communications (e.g. emails, chat, text messages, or voice calls) between user device 104K and user device 104M. In this case, the network security monitoring device 102 restricts future communications between the user devices 104 to remove the unauthorized communication channel 304.

As another example, the network security monitoring device 102 may identify an application that was accessed using the user device 104 based on the user interaction data 124 that is associated with the user device 104. The network security monitoring device 102 may then modify one or more settings on the user device 104 to restrict future access to the identified application. In this case, the network security monitoring device 102 restricts future access to the application to remove the unauthorized communication channel 304. In other examples, the network security monitoring device 102 may restrict access to specific functions or features within an application or may mask data that is visible within the application.

As another example, the network security monitoring device 102 may identify an email address that was used by the user device 104 based on the user interaction data 124 that is associated with the user device 104. The network security monitoring device 102 may then modify one or more settings on the user device 104 to restrict communications to and from the email address. The network security monitoring device 102 may block communications to certain email address, delist the email address from a mail distribution group, mask information within incoming or outgoing emails, remove attachments from incoming or outgoing emails, or any other suitable type of operation to restrict communications to and from the email address.

As another example, the network security monitoring device 102 may identify a website that was accessed using the user device 104 based on the user interaction data 124 that is associated with the user device 104. The network security monitoring device 102 may then modify one or more settings on the user device 104 to restrict future access to the identified website. In this case, the network security monitoring device 102 restricts future access to the website to remove the unauthorized communication channel 304.

As another example, the network security monitoring device 102 may identify a social media platform that was accessed using the user device 104 based on the user interaction data 124 that is associated with the user device 104. The network security monitoring device 102 may then modify one or more settings on the user device 104 to restrict future access to the identified social media platform. In this case, the network security monitoring device 102 restricts future access to the social media platform to remove the unauthorized communication channel 304.

As another example, the network security monitoring device 102 may identify a physical location that was accessed by a user that is associated with the user device 104 based on the user interaction data 124 that is associated with the user device 104. In this example, the user device 104 may be a keycard or a key fob that can be used to gain access to a physical location. The physical location may be a file room, a different department, a server room, or any other suitable type of location with restricted access. The network security monitoring device 102 may then modify one or more settings on the user device 104 to restrict future access to the physical location. In this case, the network security monitoring device 102 restricts future access to the physical location to remove the unauthorized communication channel 304.

In some embodiments, the network security monitoring device 102 may determine to not restrict communications between the selected user device 104 and another user device 104 from within the identified cluster 302. In this case, the network security monitoring device 102 may elect to not modify the settings on the selected user device 104 or may modify the hardware, software, and/or network settings on the user device 104 to enable or allow future communications between the user device 104 and another user device 104 from within the identified cluster 302.

In some embodiments, the network security monitoring device 102 may determine to begin monitoring or to increase monitoring for future incoming and outgoing communications by the user device 104. For example, the network security monitoring device 102 may keep a log of communications for the user device 104. This process allows the network security monitoring device 102 to continue monitoring the user device 104 for any future unauthorized communications and activity.

In some embodiments, the network security monitoring device 102 may send an alert or notification to a system administrator that indicates that an anomaly or unauthorized communication channel 304 has been detected. The network security monitoring device 102 may send information about any modifications that were made to the user device 104 to remove the unauthorized communication channel 304.

At step 222, the network security monitoring device 102 determines whether to select another user device 104 from within the identified cluster 302. The network security monitoring device 102 may determine to select another user device 104 when one or more user devices 104 from within the identified cluster 302 have not had their settings checked or modified by the network security monitoring device 102. In other words, the network security monitoring device 102 will continue to identify user devices 104 within the identified cluster 302 to modify their settings to remove any remaining unexpected communication channels 304. The network security monitoring device 102 returns to step 218 in response to determining to select another user device 104 from within the identified cluster 302. In this case, the network security monitoring device 102 returns to step 218 to select another user device 104 from within the identified cluster 302 to examine and modify its settings. The network security monitoring device 102 proceeds to step 224 in response to determining not to select another user device 104 from within the identified cluster 302. In this case, the network security monitoring device 102 proceeds to step 224 to determine whether there are any additional unexpected clusters 302 to analyze and process.

At step 224, the network security monitoring device 102 determines whether to select another cluster 302. The network security monitoring device 102 may determine to select another cluster 302 when one or more clusters 302 that are associated with unauthorized communication channels 304 from among the second set of clusters 302 have not been analyzed or processed. The network security monitoring device 102 returns to step 216 in response to determining to select another cluster 302. In this case, the network security monitoring device 102 returns to step 216 to select another cluster 302 that is associated with an unauthorized communication channel 304 to analyze and process. The network security monitoring device 102 terminates process 200 in response to determining not to select another cluster. In this case, the network security monitoring device 102 determines that the anomaly detection process is complete.

Temporal-Based Anomaly Detection Process

Figure 5:
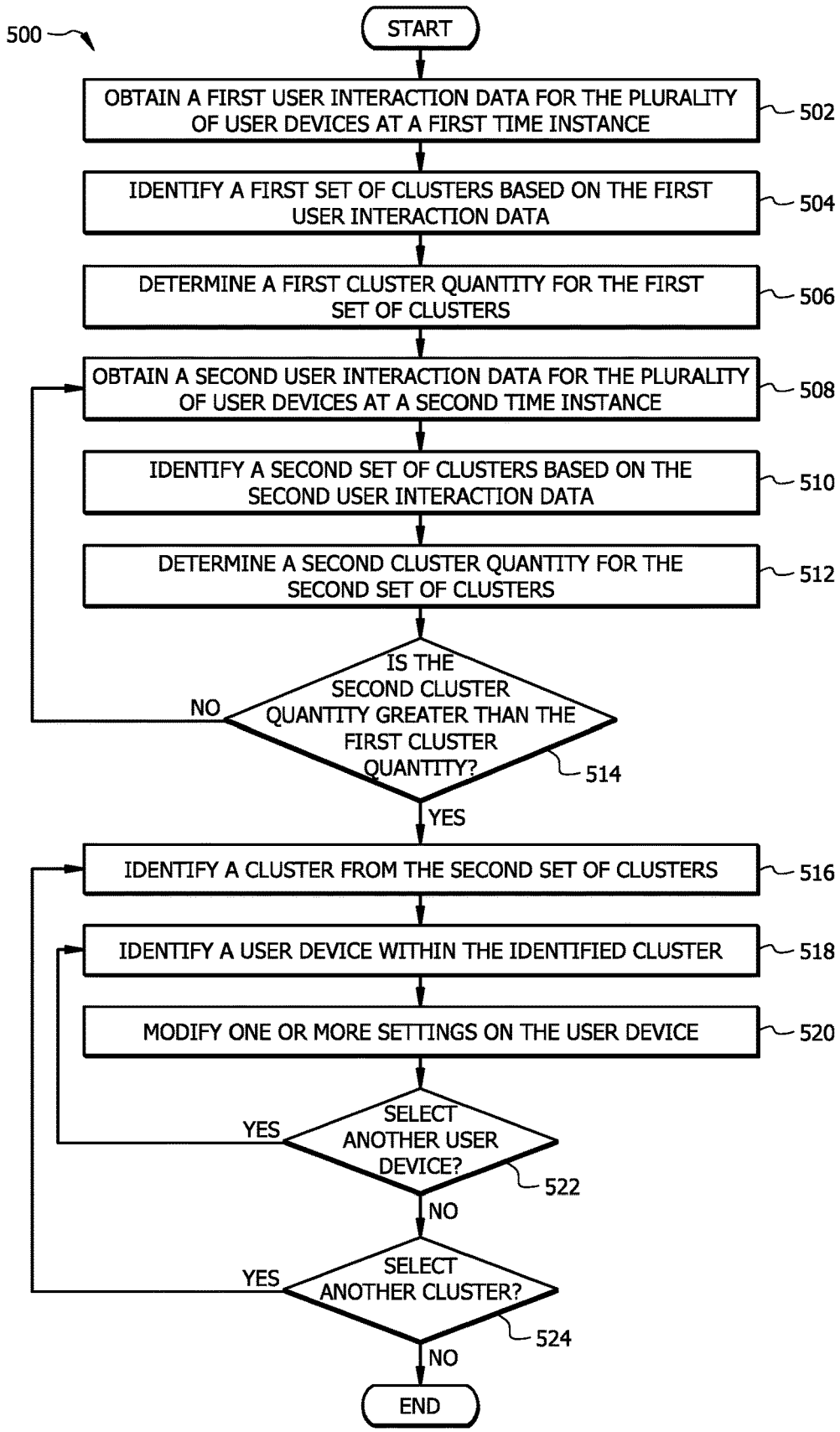
FIG. 5 is a flowchart of an embodiment of a temporal-based anomaly detection process for the information system.

FIG. 5 is a flowchart of an embodiment of a temporal-based anomaly detection process 500 for the information system 100. The information system 100 may employ process 500 to observe interactions between the user devices 104 over time and to detect any unexpected or unauthorized communication channels 304 between the user devices 104. As the user devices 104 interact with each other over time, new authorized communication channels 304 may be formed between the user devices 104. Process 500 employs machine learning to observe the interactions between the user devices 104 over time and to detect any of these unexpected or unauthorized communication channels 304 that form between the user devices 104. In response to detecting an unauthorized communication channel 304, the information system 100 is further configured to identify a user device 104 that is associated with an unauthorized communication channel 304 and to modify hardware, software, and/or network settings on the user device 104 to remove the unauthorized communication channel 304. This process allows the information system 100 to detect and prevent unauthorized access to data and other network security vulnerabilities within the network 108.

At step 502, the network security monitoring device 102 obtains a first user interaction data 124 for a plurality of user devices 104 at a first time instance. The first user interaction data 124 comprise information about the activities performed by the plurality of user devices 104 before the first time instance. In one embodiment, the network security monitoring device 102 may periodically receive user interaction data 124 from the plurality of user devices 104. For example, the network security monitoring device 102 may receive user interaction data 124 at predetermined time intervals (e.g. hourly or daily). In other embodiments, the network security monitoring device 102 may send data requests to the user devices 104 to request user interaction data 124.

Figure 6:
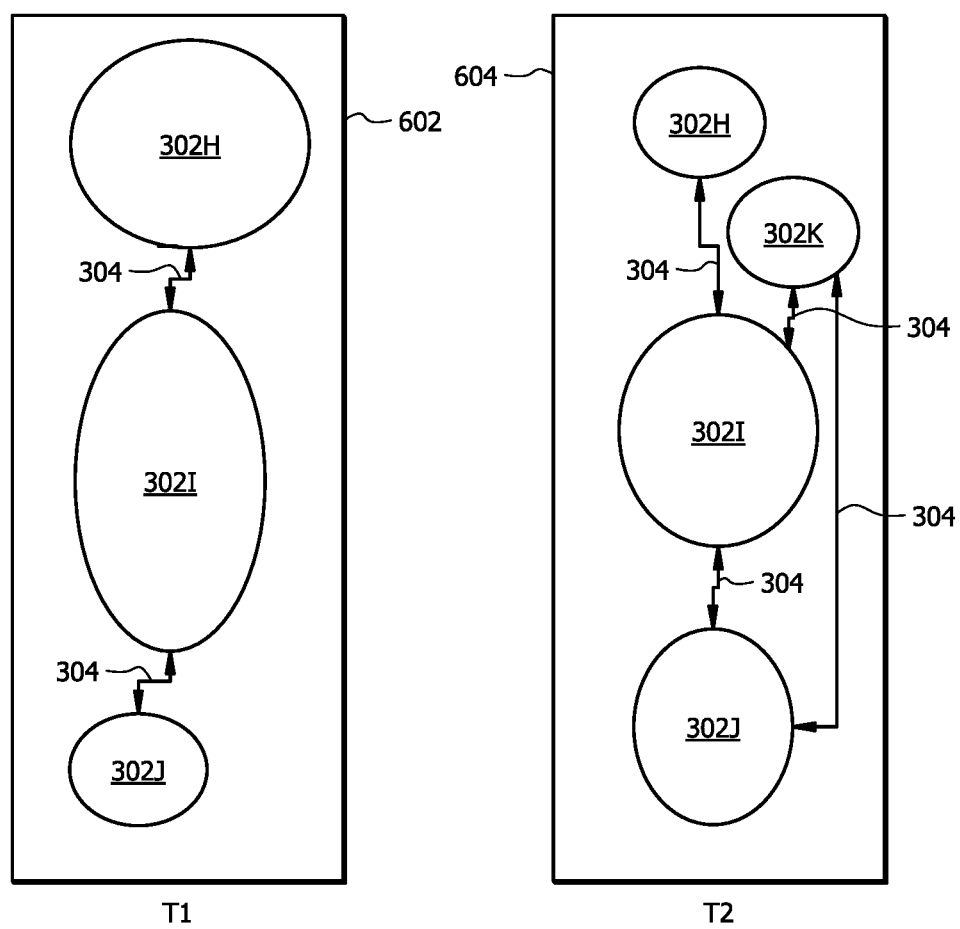
FIG. 6 is an example of clusters that are detected during the temporal-based anomaly detection process.

At step 504, the network security monitoring device 102 identifies a first set of clusters 302 based on the first user interaction data 124. The network security monitoring device 102 inputs the first user interaction data 124 into the machine learning model 122 to determine how the plurality of user devices 104 are interacting and communicating with each other. The network security monitoring device 102 receives information about the first set of clusters 302 in response to inputting the first user interaction data 124 into the machine learning model 122. For example, the machine learning model 122 may output a list of cluster identifiers (e.g. alphanumeric identifiers) that identify the clusters 302 that were detected by the machine learning model 122. Each cluster identifier is associated with device identifiers that identify the user devices 104 that are members of the cluster 302. In the example shown in FIG. 6, at the first time instance 602, the machine learning model 122 identifies three clusters 302 (shown as clusters 302H, 302I, and 302J) based on the first user interaction data 124.

At step 506, the network security monitoring device 102 determines a first cluster quantity for the first set of clusters 302. The network security monitoring device 102 counts the number of clusters 302 that have been identified by the machine learning model 122 based on the first user interaction data 124. Continuing with the previous example from FIG. 6, the network security monitoring device 102 sets the first cluster quantity to a value of three.

At step 508, the network security monitoring device 102 obtains a second user interaction data 124 for the plurality of user devices 104 at a second time instance. The second user interaction data 124 comprise information about the activities performed by the plurality of user devices 104 between the first time instance and the second time instance. The network security monitoring device 102 obtains a second user interaction data 124 using a process similar to the process described in step 502. The network security monitoring device 102 may obtain the second user interaction data 124 at any time after obtaining the first user interaction data 124. For example, the network security monitoring device 102 may obtain the second user interaction data 124 after thirty minutes, after one hour, after twelve hours, after twenty-four hours, or any after any other suitable duration of time.

At step 510, the network security monitoring device 102 identifies a second set of clusters 302 based on the second user interaction data 124. The network security monitoring device 102 inputs the second user interaction data 124 into the machine learning model 122 to determine how the plurality of user devices 104 are interacting and communicating with each other between the first time instance and the second time instance. The network security monitoring device 102 receives information about the second set of clusters 302 in response to inputting the second user interaction data 124 into the machine learning model 122. In the example shown in FIG. 6, at the second time instance 604, the machine learning model 122 identifies four clusters 302 (shown as clusters 302H, 302I, 302J, and 302K) based on the second user interaction data 124.

At step 512, the network security monitoring device 102 determines a second cluster quantity for the second set of clusters 302. The network security monitoring device 102 counts the number of clusters 302 that have been identified by the machine learning model 122 based on the second user interaction data 124. Continuing with the previous example from FIG. 6, the network security monitoring device 102 sets the second cluster quantity to a value of four.

At step 514, the network security monitoring device 102 determines whether the second cluster quantity is greater than the first cluster quantity. Here, the network security monitoring device 102 compares the number of clusters 302 that were determined based on the first user interaction data 124 to the number of clusters 302 based on the second user interaction data 124 to determine whether there any new clusters 302. Continuing with the previous example from FIG. 6, the network security monitoring device 102 determines that the second cluster quantity is greater than the first cluster quantity. This means that an anomaly has been detected because at least one new cluster 302 was detected that was not present based on the first user interaction data 124. When the second cluster quantity is equal to the first cluster quantity, this means that no new clusters 302 have been detected and that an anomaly has not been detected.

The network security monitoring device 102 returns to step 508 in response to determining that the second cluster quantity is not greater than the first cluster quantity. In this case, the network security monitoring device 102 returns to step 508 to wait for additional user interaction data 124 to process to determine whether an anomaly has occurred. The network security monitoring device 102 proceeds to step 516 in response to determining that the second cluster quantity is greater than the first cluster quantity. In this case, the network security monitoring device 102 proceeds to step 516 to identify the user devices 104 that are associated with any unauthorized communication channels 304 and to modify the settings of these user devices 104 to either prevent or allow these communication channels 304.

At step 516, the network security monitoring device 102 identifies a cluster 302 from the second set of clusters 302 that is not present in the first set of clusters 302. Here, the network security monitoring device 102 identifies one of the clusters 302 from the second set of clusters 302 that was not present at the first time instance based on the first user interaction data 124. Continuing with the previous example from FIG. 6, the network security monitoring device 102 identifies cluster 302K from among the second set of clusters 302. In this example, cluster 302K is associated with a new unauthorized communication channel 304 between cluster 302K and 302J.

At step 518, the network security monitoring device 102 identifies a user device 104 within the identified cluster 302. Here, the network security monitoring device 102 identifies one of the user devices 104 within the identified cluster 302 that is associated with the unauthorized communication channel 304.

At step 520, the network security monitoring device 102 modifies one or more settings on the user device 104. The network security monitoring device 102 may adjust the hardware, software, and/or network settings on the user device 104 to remove any unauthorized communication channels 304. The network security monitoring device 102 may modify one or more settings on the user device 104 using a process similar to the process described in step 220 of FIG. 2.

At step 522, the network security monitoring device 102 determines whether to select another user device 104 from within the identified cluster 302. The network security monitoring device 102 may determine to select another user device 104 when one or more user devices 104 from within the identified cluster 302 have not had their settings checked or modified by the network security monitoring device 102. In other words, the network security monitoring device 102 will continue to identify user devices 104 within the identified cluster 302 that are associated with an unauthorized communication channel 304 to modify their settings to remove any unauthorized communication channels 304. The network security monitoring device 102 returns to step 518 in response to determining to select another user device 104 from within the identified cluster 302. In this case, the network security monitoring device 102 returns to step 518 to select another user device 104 from within the identified cluster 302 that is associated with an unauthorized communication channel 304 to examine and modify its settings. The network security monitoring device 102 proceeds to step 524 in response to determining not to select another user device 104 from within the identified cluster 302. In this case, the network security monitoring device 102 proceeds to step 524 to determine whether there are any additional unexpected clusters 302 to analyze and process.

At step 524, the network security monitoring device 102 determines whether to select another cluster 302. The network security monitoring device 102 may determine to select another cluster 302 when one or more clusters 302 that are associated with unauthorized communication channels 304 from among the second set of clusters 302 have not been analyzed or processed. The network security monitoring device 102 returns to step 516 in response to determining to select another cluster 302. In this case, the network security monitoring device 102 returns to step 516 to select another cluster 302 that is associated with an unauthorized communication channel 304 to analyze and process. The network security monitoring device 102 terminates process 500 in response to determining not to select another cluster. In this case, the network security monitoring device 102 determines that the anomaly detection process is complete. In some embodiments, the network security monitoring device 102 may return to step 508 to wait for additional user interaction data 124 to process to determine whether another unauthorized communication channel 304 has been formed. This process allows the network security monitoring device 102 to periodically obtain and analyze user interaction data 124 to determine whether another anomaly or unauthorized communication channel 304 has been detected.

Hardware Configuration for the Network Security Monitoring Device

Figure 7:
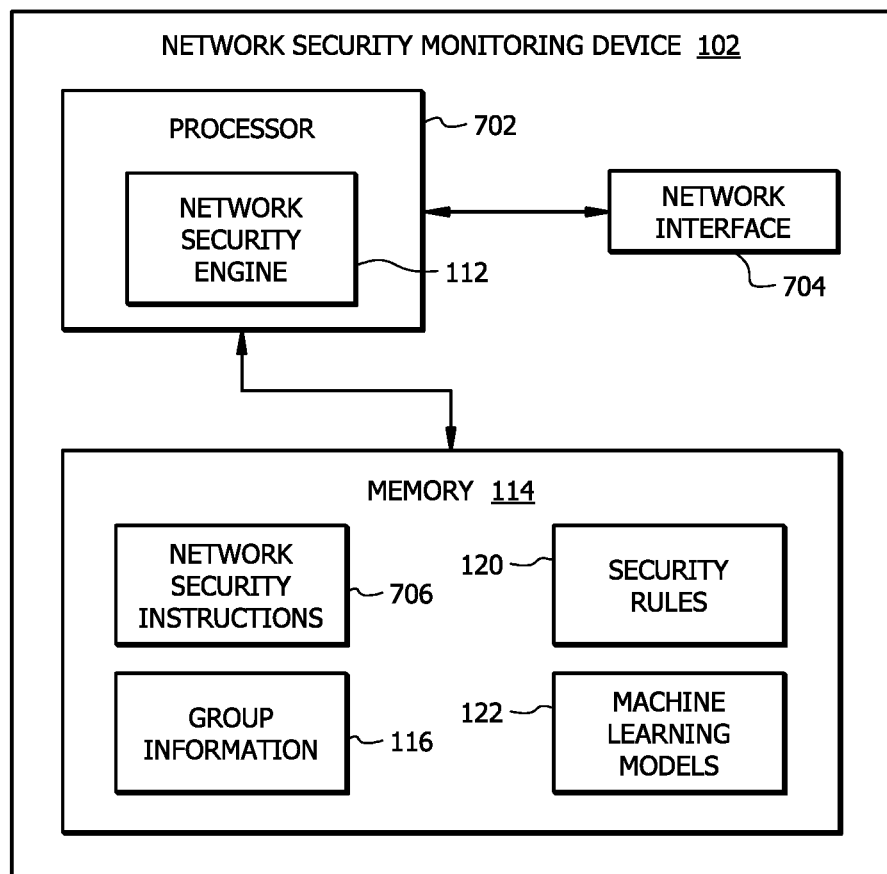
FIG. 7 is an embodiment of a network security monitoring device configured to employ anomaly detection for the information system.

FIG. 7 is an embodiment of the network security monitoring device 102 of an information system 100. As an example, the network security monitoring device 102 comprises a processor 702, a memory 114, and a network interface 704. The network security monitoring device 102 may be configured as shown or in any other suitable configuration.

Processor

The processor 702 comprises one or more processors operably coupled to the memory 114. The processor 702 is any electronic circuitry including, but not limited to, state machines, one or more central processing unit (CPU) chips, logic units, cores (e.g. a multi-core processor), field-programmable gate array (FPGAs), application-specific integrated circuits (ASICs), or digital signal processors (DSPs). The processor 702 may be a programmable logic device, a microcontroller, a microprocessor, or any suitable combination of the preceding. The processor 702 is communicatively coupled to and in signal communication with the memory 114 and the network interface 704. The one or more processors are configured to process data and may be implemented in hardware or software. For example, the processor 702 may be 8-bit, 16-bit, 32-bit, 64-bit, or of any other suitable architecture. The processor 702 may include an arithmetic logic unit (ALU) for performing arithmetic and logic operations, processor registers that supply operands to the ALU and store the results of ALU operations, and a control unit that fetches instructions from memory and executes them by directing the coordinated operations of the ALU, registers and other components.

The one or more processors are configured to implement various instructions. For example, the one or more processors are configured to execute network security instructions 706 to implement network security engine 112. In this way, processor 702 may be a special-purpose computer designed to implement the functions disclosed herein. In an embodiment, the network security engine 112 is implemented using logic units, FPGAs, ASICs, DSPs, or any other suitable hardware. The network security engine 112 is configured to operate as described in FIGS. 1-6. For example, the network security engine 112 may be configured to perform the steps of process 200 and 500 as described in FIGS. 2 and 5, respectively.

Memory

The memory 114 is operable to store any of the information described above with respect to FIGS. 1-6 along with any other data, instructions, logic, rules, or code operable to implement the function(s) described herein when executed by the processor 702. The memory 114 comprises one or more disks, tape drives, or solid-state drives, and may be used as an over-flow data storage device, to store programs when such programs are selected for execution, and to store instructions and data that are read during program execution. The memory 114 may be volatile or non-volatile and may comprise a read-only memory (ROM), random-access memory (RAM), ternary content-addressable memory (TCAM), dynamic random-access memory (DRAM), and static random-access memory (SRAM).

The memory 114 is operable to store network security instructions 706, group information 116, security rules 120, machine learning models 122, and/or any other data or instructions. The network security instructions 706 may comprise any suitable set of instructions, logic, rules, or code operable to execute the network security engine 112. The group information 116, the security rules 120, and the machine learning models 122 are configured similar to the group information 116, the security rules 120, and the machine learning models 122 described in FIGS. 1-6, respectively.

Network Interface

The network interface 704 is configured to enable wired and/or wireless communications. The network interface 704 is configured to communicate data between user devices 104, databases 106, and other devices, systems, or domains. For example, the network interface 704 may comprise a near-field communication (NFC) interface, a Bluetooth interface, a Zigbee interface, a Z-wave interface, a radio-frequency identification (RFID) interface, a WIFI interface, a LAN interface, a WAN interface, a PAN interface, a modem, a switch, or a router. The processor 702 is configured to send and receive data using the network interface 704. The network interface 704 may be configured to use any suitable type of communication protocol as would be appreciated by one of ordinary skill in the art.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated with another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

To aid the Patent Office, and any readers of any patent issued on this application in interpreting the claims appended hereto, applicants note that they do not intend any of the appended claims to invoke 35 U.S.C. § 112(f) as it exists on the date of filing hereof unless the words "means for" or "step for" are explicitly used in the particular claim.

The invention claimed is:

1. A network security device, comprising:
a network interface in signal communication with the plurality of user devices;
a memory operable to store group information that is associated with the plurality of user devices, wherein:
the group information identifies a plurality of work groups; and
each work group comprises one or more user devices from among the plurality of user devices; and
a processor operably coupled to the network interface and the memory, and configured to:

identify a first set of clusters based on the group information, wherein each cluster corresponds with a work group from among the plurality of workgroups;
determine a first cluster quantity that identifies a number of clusters within the first set of clusters;
obtain user interaction data for the plurality of user devices, wherein the user interaction data identifies activities performed by a user that is associated with a user device;
input the user interaction data into a machine learning model, wherein the machine learning model is configured to:
receive the user interaction data; and
output a second set of clusters for the plurality of user devices based on the user interaction data;
determine a second cluster quantity that identifies a number of clusters within the second set of clusters;
compare the first cluster quantity to the second cluster quantity;
determine the second cluster quantity is greater than the first cluster quantity;
identify a first cluster from the second set of clusters that is not present in the first set of clusters;
identify a first user device within the first cluster; and
modify one or more device settings on the first user device.

2. The device of claim 1, wherein modifying the one or more settings on the first user device comprises:
identifying a second user device within the first cluster; and
enabling communications between the first user device and the second user device.

3. The device of claim 1, wherein modifying the one or more settings on the first user device comprises:
identifying a second user device within the first cluster; and
restricting communications between the first user device and the second user device.

4. The device of claim 1, wherein:
the user interaction data identifies an application that was accessed using the first user device; and
modifying the one or more settings on the first user device comprises restricting access to the application.

5. The device of claim 1, wherein:
the user interaction data identifies a website that was accessed using the first user device; and
modifying the one or more settings on the first user device comprises restricting access to the website.

6. The device of claim 1, wherein:
the user interaction data identifies a physical location that was accessed by a user associated with the first user device; and
modifying the one or more settings on the first user device comprises restricting access to the physical location for the user.

7. The device of claim 1, wherein the processor is further configured to monitor communications sent by the first user device after identifying the first user device.

8. An anomaly detection method, comprising:
identifying a first set of clusters based on group information, wherein:
the group information identifies a plurality of work groups;
each work group comprises one or more user devices from among the plurality of user devices; and
each cluster corresponds with a work group from among the plurality of workgroups;
determining a first cluster quantity that identifies a number of clusters within the first set of clusters;
obtaining user interaction data for the plurality of user devices, wherein the user interaction data identifies activities performed by a user that is associated with a user device;
inputting the user interaction data into a machine learning model;
receiving a second set of clusters for the plurality of user devices from the machine learning model based on the user interaction data;
determining a second cluster quantity that identifies a number of clusters within the second set of clusters;
comparing the first cluster quantity to the second cluster quantity;
determining the second cluster quantity is greater than the first cluster quantity;
identifying a first cluster from the second set of clusters that is not present in the first set of clusters;
identifying a first user device within the first cluster; and
modifying one or more device settings on the first user device.

9. The method of claim 8, wherein modifying the one or more settings on the first user device comprises:
identifying a second user device within the first cluster; and
enabling communications between the first user device and the second user device.

10. The method of claim 8, wherein modifying the one or more settings on the first user device comprises:
identifying a second user device within the first cluster; and
restricting communications between the first user device and the second user device.

11. The method of claim 8, wherein:
the user interaction data identifies an application that was accessed using the first user device; and
modifying the one or more settings on the first user device comprises restricting access to the application.

12. The method of claim 8, wherein:
the user interaction data identifies a website that was accessed using the first user device; and
modifying the one or more settings on the first user device comprises restricting access to the website.

13. The method of claim 8, wherein:
the user interaction data identifies a physical location that was accessed by a user associated with the first user device; and
modifying the one or more settings on the first user device comprises restricting access to the physical location for the user.

14. The method of claim 8, further comprising monitoring communications sent by the first user device after identifying the first user device.

15. A non-transitory computer-readable medium storing instructions that when executed by a processor cause the processor to:
identify a first set of clusters based on group information, wherein:
the group information identifies a plurality of work groups;
each work group comprises one or more user devices from among the plurality of user devices; and
each cluster corresponds with a work group from among the plurality of workgroups;
determine a first cluster quantity that identifies a number of clusters within the first set of clusters;

obtain user interaction data for the plurality of user devices, wherein the user interaction data identifies activities performed by a user that is associated with a user device;

input the user interaction data into a machine learning model;

receive a second set of clusters for the plurality of user devices from the machine learning model based on the user interaction data;

determine a second cluster quantity that identifies a number of clusters within the second set of clusters;

compare the first cluster quantity to the second cluster quantity;

determine the second cluster quantity is greater than the first cluster quantity;

identify a first cluster from the second set of clusters that is not present in the first set of clusters;

identify a first user device within the first cluster; and modify one or more device settings on the first user device.

16. The non-transitory computer readable medium of claim 15, wherein modifying the one or more settings on the first user device comprises:

identifying a second user device within the first cluster; and enabling communications between the first user device and the second user device.

17. The non-transitory computer readable medium of claim 15, wherein modifying the one or more settings on the first user device comprises:

identifying a second user device within the first cluster; and restricting communications between the first user device and the second user device.

18. The non-transitory computer readable medium of claim 15, wherein:

the user interaction data identifies an application that was accessed using the first user device; and modifying the one or more settings on the first user device comprises restricting access to the application.

19. The non-transitory computer readable medium of claim 15, wherein:

the user interaction data identifies a website that was accessed using the first user device; and modifying the one or more settings on the first user device comprises restricting access to the website.

20. The non-transitory computer readable medium of claim 15, wherein:

the user interaction data identifies a physical location that was accessed by a user associated with the first user device; and modifying the one or more settings on the first user device comprises restricting access to the physical location for the user.

* * * * *